United States Patent Office 3,277,019
Patented Oct. 4, 1966

3,277,019
METHOD OF PREPARING A CATALYST COMPOSITION CONSISTING OF THE OXIDES OF ZINC, SILVER, CALCIUM AND CHROMIUM
Vernon V. Young, Terre Haute, Ind., assignor to Commercial Solvents Corporation, a corporation of Maryland
No Drawing. Filed Dec. 16, 1963, Ser. No. 330,592
13 Claims. (Cl. 252—465)

This application is a continuation-in-part of my application Serial No. 113,625, filed May 31, 1961, now abandoned, entitled "Production of Oximes."

My invention relates to the production of oximes, amines and hydroxylamines; and more particularly it relates to a catalyst and a process for the production of an improved catalyst utilized in the manufacture of oximes, amines, and hydroxylamines from primary and secondary nitroparaffins containing at least two carbons. The invention further relates to a catalyst and process for the selective production of the oximes.

Oximes and particularly the cycloalkanone oximes are important intermediary products in chemical processes. More specifically, cyclohexanone oxime is utilized for the preparation of caprolactam which is a valuable product for the manufacture of synthetic fibers and plasticizers.

Oximes have long been prepared by the partial reduction of primary and secondary nitroparaffins containing at least two carbon atoms. Such reductions can be effected by the hydrogenation of the nitroparaffin in the presence of a catalyst, such as was disclosed by Grundmann in Agnew. Chem., volume 62, pages 558–560 (1950). The Grundmann reference shows hydrogenation of nitrocyclohexane to cyclohexanone oxime using various catalysts. His publication disclosed that his best catalyst, for this purpose, is a silver oxide, zinc oxide, chromium oxide, calcium oxide catalyst. U.S. Patent No. 2,711,427 discloses an improvement of this process, wherein an alkaline material is employed as a promoter of the reaction.

The Grundmann reference and U.S. Patent 2,711,427 disclose the preparation of the operative catalyst as follows: silver nitrate [$AgNO_3$, 3.4 grams], calcium nitrate [$Ca(NO_3)_2 \cdot 4H_2O$, 4.7 grams], and zinc nitrate [$Zn(NO)_2 \cdot 6H_2O$, 47 grams]

are dissolved in 200 milliliters of hot distilled water. A second solution containing ammonium dichromate [$(NH_4)_2Cr_2O_7$, 25.2 grams] and concentrated ammonium hydroxide (30 milliliters) in 150 milliliters of distilled water is prepared and poured as a fine stream into the first solution with vigorous stirring. The precipitate is immediately filtered, dried by means of suction, and heated in a furnace for 1.5 hours at 350–400° C. After cooling, the product is triturated in a mortar with 2 N acetic acid and dried on a suction filter. This treatment is repeated and the product is finally washed with distilled water and dried at 100° C. No catalyst support is required, but if desired, a carrier such as pumice clay, alumina, kieselguhr, etc., may be used.

I have now discovered a new process for preparing a similar catalyst which is convenient, more economical, and results in a more active catalyst than that prepared by the method described above. For instance, the precipitation and filtration steps are obviated. It was surprising to find that a simple mixture of soluble and/or insoluble salts of the metals can be utilized to provide effective catalysts. As water-insoluble salts can be used in the present process, the economic advantages and the convenience of the process are apparent, particularly when considering the fact that industry is often presented with the problem of finding suitable uses for water-insoluble salts. Not only is my catalyst more active in the production of oximes, amines, and hydroxylamines in that it allows the reaction to reach completion in a shorter period of time, but it also can be reused numerous times and still retain its activity. Also, less of my catalyst need be used to achieve desired results.

In my process for preparing the silver oxide, zinc oxide, chromium oxide (including e.g., chromium trioxide which is also known as chromic acid), calcium oxide catalyst, the silver atoms are derived from silver acetate, silver oxide, silver nitrate, or silver carbonate; the zinc atoms are derived from zinc acetate or zinc oxide; the chromium atoms are derived from chromium acetate, chromium oxide, ammonium dichromate; and the calcium atoms are derived from calcium oxide, calcium acetate, or calcium hydroxide. The final composition of the catalyst contains catalytic amounts of the oxides of calcium, silver, zinc and chromium. These amounts generally include less than 3%, e.g. 0.01 to 3%, calcium oxide, from about 3% to 5% to about 15% or 20% silver oxide, with the remainder being made up of zinc oxide and chromium oxide preferably in substantially equal parts. Catalyst preparations with more than 3% calcium oxide appear to be less active; however, the presence of some calcium oxide definitely increases the catalyst activity. Silver oxide contents of 11% and 15% in the catalyst appear to have comparable activities; however, a silver oxide content reduced to 5%, if activated by heat, increased the reaction time (i.e., reduced activity) although conversions remained comparable to conversions utilizing a catalyst preparation having a higher silver oxide content.

My new process for preparing the catalyst very generally is to make an intimate mixture of the salts of silver, zinc, chromium, and calcium. This intimate mixture may either be dry or a solution and/or slurry, depending upon the compounds used, with acetic acid and water although the use of a slurry is advantageous in that it provides a more intimate admixture of the components. For instance, the catalyst can be advantageously prepared by slurrying a compound selected from the group consisting of about 4 to about 25 or 30 parts by weight silver acetate, from about 3 or 5 to about 15 or 20 parts by weight silver oxide, from about 4 or 7 to about 22 or 30 parts by weight silver nitrate, and from about 3 or 6 to about 18 or 25 parts by weight silver carbonate; with a compound selected from the group consisting of about 95 to about 147 parts by weight zinc acetate and from about 35 to about 55 parts by weight zinc oxide; with a compound selected from the group consisting of about 35 to about 72 parts by weight chromium oxide, from about 105 to about 165 parts by weight chromium acetate and from about 58 to about 92 parts by weight ammonium dichromate, with a compound selected from the group consisting of less than about 3 parts by weight calcium oxide, less than 10 parts by weight calcium acetate, and less than 4 parts by weight calcium hydroxide; with acetic acid and water; stirring and evaporating the above said slurry to dryness, and calcinating the residue of the dried slurry. I calcinate the mixture at temperatures of from about 250° or 290° C. to about 500° C. Resulting is a fused residue which I triturate with a small amount of acetic acid and then wash with a small amount of water. The catalyst is then dried at about 110° C. When I prepare my catalyst I can further activate it by reheating at high temperatures, generally from about 350 or 400 to 450 or 500° C., such as 450° C. for instance, for a period of time sufficient to activate the catalyst, generally from about 0.5 to 5.0 hours. Such activation is particularly advantageous for a catalyst containing from about 3% to 11% silver oxide.

When I prepare the catalyst from a slurry, I prefer to mix the metallic salts with acetic acid and water. When using chromium trioxide as the source of chromium, instead of chromium oxide, ammonium dichromate, or acetate, I prefer to dissolve the chromium trioxide in water before adding it to the other components of the slurry. I then stir the slurry and evaporate it to dryness prior to the calcination step.

In another aspect of the present invention, I have surprisingly found that the addition of alumina ($Al_2O_3$) to my catalyst extends the age of the catalyst, i.e. it can be reused numerous times. When I prepare the catalyst from a slurry, I have found it convenient to incorporate alumina with my catalyst by adding alumina particles to the slurry before evaporation. No special catalytic grade of alumina is necessary, and any type of alumina can be used satisfactorily. The alumina is mixed with the catalyst in amounts sufficient to extend the life of the catalyst, generally these amounts will range from about 0.01 to 80 percent, preferably 25 to 75 percent, based on the weight of the resulting catalyst.

The following examples are offered to illustrate my invention; however, I do not intend to be limited by them. Rather, I intend to include within the scope of my invention all equivalents obvious to those skilled in the art.

Example I

A slurry was prepared from 560 grams of 50% aqueous chromium acetate, 270 grams of zinc acetate dihydrate, 50 grams of silver acetate, 10 grams of calcium acetate, and 500 milliliters of water. The resulting slurry was mixed, stirred, and evaporated to dryness, and the residue was heated for two hours at 350–375° C. After cooling, the residue was triturated with 200 milliliters of 1 N acetic acid and rinsed with small amounts of water. After the rinse, the catalyst was dried at 100° C.

Example II

A slurry was prepared from 560 grams of 50% aqueous chromium acetate, 100 grams of zinc oxide, 50 grams of silver acetate, 3 grams of calcium acetate, 100 grams of glacial acetic acid and 500 milliliters of water. The resulting slurry was stirred and evaporated to dryness, and the residue heated for two hours at 350–375° C. After cooling, the residue was triturated with 200 milliliters of 1 N acetic acid and rinsed with a small amount of water. After the rinse, the catalyst was dried at 100° C.

Example III

A slurry was prepared from 560 grams of 50% aqueous chromium acetate, 100 grams of zinc oxide, 34.72 grams of silver oxide, 3.15 grams of calcium oxide, 100 grams of glacial acetic acid, and 500 milliliters of water. The resulting slurry was mixed, stirred, and evaporated to dryness, and the residue was heated for two hours at 350–375° C. After cooling, the residue was triturated with 200 milliliters of 1 N acetic acid and rinsed with a small amount of water. After the rinse, the catalyst was dried at 100° C.

Example IV

A mixture was prepared from 34.72 grams of silver oxide, 100 grams of zinc oxide, 3.15 grams of calcium oxide, 300 milliliters of water, and 100 grams of glacial acetic acid. The above mixture was stirred, and to it was added 122.5 grams of chromium trioxide dissolved in 200 milliliters of water. The resulting slurry was stirred and evaporated to dryness and the residue was heated for two hours at 350–375° C. After cooling, the residue was triturated with 200 milliliters of 1 N acetic acid and rinsed with a small amount of water. After the rinse, the catalyst was dried at 100° C.

Example V

A mixture was prepared from 45.0 grams of zinc oxide, 57.0 grams of chromium trioxide, 4.8 grams of calcium acetate, 48.0 grams of glacial acetic acid in 450 milliliters of water. To this slurry, a solution of 15.5 grams of silver nitrate in 15 milliliters of water was added as a fine stream. The resulting slurry was stirred and evaporated to dryness. The residue was heated for eight hours at 450° C. After cooling, the fused residue was triturated with 100 ml. of 1 N acetic acid, and rinsed with a small amount of water. After the rinse, the catalyst was dried at 110° C.

Example VI

A slurry was prepared from 12.5 grams of silver carbonate, 45.0 grams of zinc oxide, 56.9 grams of chromium trioxide, and 2.0 grams of calcium hydroxide stirred into 48.0 grams of glacial acetic acid in 450 millilters of water. This slurry was evaporated to dryness. The residue was heated at 450° C. for six hours. The fused catalyst was then triturated with 100 milliliters of 1 N acetic acid, and rinsed with a small amount of water. The catalyst was then dried at 110° C.

Example VII

Samples of catalysts prepared in Examples I, II, III, and IV were heated at 450° C. for two hours.

Example VIII

Catalysts prepared and treated as described in Examples I, II, III, IV, V, VI, and VII were tested as follows: A 1-liter, stainless steel rocking bomb was charged with 390 grams of nitrocyclohexane, 390 grams of methanol solvent, and 10 grams of a sample of catalyst prepared and treated as described in the above examples. Hydrogen under 500 p.s.i. was added and the bomb charge heated to 135° C. The hydrogen pressure was increased to 1,000 p.s.i. and the reduction continued to a specific hydrogen uptake. Results are shown below.

| Run | Catalyst | H₂ Uptake | Time (hour) | Analysis, Percent by Weight ||| Percent Conversion |
|---|---|---|---|---|---|---|---|
| | | | | Nitrocyclohexane | Cyclohexylamine | Cyclohexanone oxime and N-cyclohexyl-hydroxylamine | |
| A | I [1] | 1,000 | 1¾ | 21.3 | 1.05 | 17.1 | 42.5 |
| B | I [1] | 1,000 | 1¾ | 14.9 | 0.92 | 17.0 | 42.5 |
| C | II [1] | 1,000 | 1¾ | 16.3 | 0.92 | 16.4 | 39.0 |
| D | II [1] | 1,000 | 1½ | 20.4 | 0.84 | 15.6 | 43.1 |
| E | II [1,2] | 1,000 | 1½ | 23.2 | 0.66 | 13.7 | 36.4 |
| F | III [1] | 1,000 | 1¾ | 24.9 | 0.78 | 14.9 | 38.5 |
| G | III [1] | 1,000 | 2 | 16.2 | 1.29 | 19.2 | 47.0 |
| H | III [1,2] | 1,000 | 2 | 15.5 | 1.80 | 20.4 | 49.6 |
| I | IV [1] | 1,000 | 4½ | 21.1 | 1.40 | 14.6 | 38.4 |
| J | IV [1,2] | 1,000 | 7 | 23.9 | 1.00 | 15.4 | 40.0 |
| K | V [3] | 1,000 | 7¾ | 19.4 | 0.48 | 22.6 | 57.2 |
| L | VI [3] | 1,000 | 1¾ | 19.5 | 1.50 | 17.6 | 52.6 |

[1] Catalyst composed of 15% silver oxide, 43.4% zinc oxide, 40.3% chromium oxide and 1.3% calcium oxide.
[2] Heated as in Example VII.
[3] Catalyst composed of 10.5% silver oxide, 45% zinc oxide, 43% chromium oxide and 1.5% calcium oxide.

Example IX

A slurry was prepared from 2.5 grams of silver oxide, 23.0 grams of zinc oxide, 0.75 gram of calcium oxide, 143.5 grams of 50% aqueous chromum acetate, 20 grams of glacial acetic acid, and 100 milliliters of water. The resulting slurry was stirred and evaporated to dryness.

The catalyst was recovered and reused in repeated reductions as indicated in the table below.

| Run Number | Reduction Time Hour:Minutes | Product Distribution, Mole Percent | | | | Conversion, Percent |
|---|---|---|---|---|---|---|
| | | Cyclohexanone Oxime | N-cyclohexyl-hydroxylamine | Cyclohexylamine | Nitrocyclohexane | |
| A | 0:51 | 16.8 | 18.0 | 3.2 | 62.0 | 35.9 |
| B | 1:35 | 26.9 | 16.8 | 5.9 | 50.4 | 43.7 |
| C | 1:17 | 27.8 | 13.1 | 11.3 | 47.8 | 40.9 |
| D | 0:55 | 16.5 | 13.8 | 6.1 | 63.6 | 30.3 |
| E | 1:14 | 17.7 | 18.3 | 5.6 | 58.6 | 35.9 |
| F | 1:22 | 17.1 | 18.3 | 6.2 | 58.4 | 35.4 |
| G | 1:14 | 18.4 | 26.3 | 5.3 | 50.4 | 44.7 |
| H | 1:28 | 24.6 | 22.5 | 3.8 | 49.1 | 47.1 |
| I | 1:22 | 19.3 | 23.4 | 3.7 | 53.6 | 42.7 |
| J | 1:50 | 39.8 | 10.7 | 1.4 | 48.1 | 50.5 |
| K | 1:46 | 27.7 | 16.5 | 4.1 | 51.7 | 44.2 |

The residue was then heated for two hours at 290° C. After cooling, the residue was triturated with 50 milliliters of 1 N acetic acid, rinsed with small amounts of water, and dried at 110° C. Four samples of this catalyst, Samples A, B, C and D, were activated by heating at 400° C. for two hours and two samples, Samples E and F, were not. Each of these catalysts contained 5% silver oxide.

*Example X*

Six runs were made in a 1-liter stainless steel rocking bomb which was charged with 267 grams of 2-nitropropane, 250 milliliters of methanol solvents, and 5 grams of each of the samples of catalyst prepared as described in Example IX. Hydrogen under 500 p.s.i. was added and the bomb charge heated to 135° C. The hydrogen pressure was increased to 1,000 p.s.i. and the reduction continued to a specific hydrogen uptake. Results are noted below.

| Catalyst Sample | Hydrogen Uptake | Time, hours | Analysis, Percent by Weight | | |
|---|---|---|---|---|---|
| | | | Isopropyl amine | N-isopropyl hydroxylamine | Acetoxime |
| A | 1,000 | 11 | 3.0 | 9.4 | 18.7 |
| B | 1,000 | 7 | 1.4 | 10.1 | 13.8 |
| C | 1,000 | 10 | 1.8 | 5.9 | 12.1 |
| D | 1,000 | 12 | 4.2 | 1.9 | 15.3 |
| E | 40 | 5 | | | |
| F | 0 | 5 | | | |

The above results show the advantage of heating the catalyst containing 5% silver oxide to activate it.

*Example XI*

A slurry was prepared from 16.7 grams of silver acetate, 46.0 grams of zinc oxide, 1.5 grams of calcium oxide, 280 grams of 50% aqueous chromium acetate solution, 50.0 grams of glacial acetic acid, 250 milliliters of water, and 107 grams (50 percent by weight) of alumina ($Al_2O_3$). The resulting slurry was stirred and evaporated to dryness. The residue was then heated for two hours at 290° C. After the residue was cooled, it was triturated with 100 milliliters of 1 N acetic acid, and rinsed with small portions of water. The catalyst was then dried at 110° C. This catalyst was activated by heating at 450° C. for two hours.

*Example XII*

A 1-liter stainless steel rocking bomb was charged with 390 grams of nitrocyclohexane, 390 grams of methyl alcohol solvent, and 10 grams of catalyst prepared as described in Example XI. Hydrogen under 500 p.s.i. was added and the charge heated to 135° C. The hydrogen pressure was increased to 1,000 p.s.i. and the reduction continued to the time, i.e. reduction time (the time required for a specific uptake of hydrogen), which time in these tests was for an uptake of 1000 lbs. of hydrogen.

The catalyst used in the above-described runs was not exhausted after the last tabulated run and could still be used for numerous additional runs. In comparison, a similar catalyst containing 10.5% silver oxide but no alumina was tested under essentially the same conditions and the following results were noted.

Run:             Reduction time, hours:minutes
A ---------------------------------------- 0:50
B ---------------------------------------- 1:15
C ---------------------------------------- 1:19
D ---------------------------------------- 1:48
E ---------------------------------------- 2:01

These results show that the catalyst containing alumina was characterized by a reduction time of 1:46 even after eleven runs, whereas the catalyst not containing alumina had a reduction time of 2:01 after five runs.

*Example XIII*

A slurry was prepared from 7.2 grams of silver acetate, 46.0 grams of zinc oxide, 286.5 grams of 50% aqueous chromium acetate, 1.5 grams of calcium oxide, 40 grams of glacial acetic acid, and 200 milliliters of water. The resulting slurry was mixed, stirred, and evaporated to dryness, and the residue was heated for two hours at 290° C. After cooling, the residue was triturated with 200 milliliters of 1 N acetic acid and rinsed with a small amount of water. The catalyst was then dried at 110° C. After drying, the resulting catalyst was activated by heating it at 400° C. for two hours.

*Example XIV*

The catalyst prepared and treated as described in Example XIII was tested as follows: A 1-liter-stainless steel rocking bomb was charged with 267 grams of 2-nitropropane, 250 milliliters of methanol solvent, and 5 grams of catalyst. Hydrogen under 500 p.s.i. was added and the bomb charge heated to 135° C. The hydrogen pressure was increased to 1,000 p.s.i and the reduction continued to a hydrogen uptake of 1,000 p.s.i. Results are shown below.

| Run | Time (hours) | Analysis, Percent by Weight | | |
|---|---|---|---|---|
| | | Acetoxime | N-isopropyl-hydroxylamine | Isopropylamine |
| 1 | 10 | 17.5 | 5.0 | 2.6 |
| 2 | 12 | 15.9 | 10.3 | 1.3 |
| 3 | 11 | 19.7 | 4.0 | 3.7 |

*Example XV*

A 1-liter stainless steel rocking bomb was charged with 267 grams of 1-nitropropane, 250 cubic centimeters of methyl alcohol solvent and 5 grams of catalyst prepared as described in Example I. Hydrogen under 500 p.s.i. was added to the bomb charge heated to 135° C. The hydrogen pressure was increased to 1,000 p.s.i. and the reduction continued to a hydrogen uptake of 1,000 p.s.i. and the following results on the reduction of nitrocyclohexane with the 10.5 and 5.0% catalysts were noted:

| Run | Catalyst | H₂ uptake | Time (hrs.) | Analysis, percent by wt. | | | Percent Conv. |
|---|---|---|---|---|---|---|---|
| | | | | Nitrocyclohexane | Cyclohexylamine | Cyclohexanone Oxime | |
| K | XVIII | 1,000 | 3½ | 18.8 | .97 | 15.0 | 47.9 |
| L | XVIII | 1,000 | 3½ | 23.0 | .68 | 13.4 | 53.8 |
| M | XVIII¹ | 1,000 | 1½ | 20.5 | .67 | 12.6 | 49.2 |
| N | XIX | 0 | 5 | | | | |
| O | XIX¹ | 1,000 | 9 | 16.8 | 1.20 | 23.1 | 54.2 |

¹ Finished catalyst heated at 450° C.

and stopped. The reduction time was eight hours and the reduced composition weighed 513 grams, contained 35.71% propionaldehyde oxime, 5.11% 1-nitropropane, for an 83.6% conversion and a yield of 93.0%.

*Example XVI*

An intimate mixture of 12.5 grams of silver carbonate, 45.0 grams of zinc oxide, 56.9 grams of chromium trioxide, and 4.8 grams of calcium acetate was made. These materials were thoroughly mixed and then heated for six hours at 450° C. The fused residue was triturated with 100 milliliters of 1 N acetic acid and rinsed with a small amount of water. The catalyst was then dried at 110° C. The resulting catalyst was of the same composition as the catalysts of Examples V and VI.

*Example XVII*

The catalyst prepared as described in Example XVI was tested as follows: A 1-liter stainless steel rocking bomb was charged with 390 grams of nitrocyclohexane, 390 grams of methanol solvent, and 10 grams of a sample of catalyst prepared as described in Example XVI. Hydrogen under 500 p.s.i. was added and the bomb charge heated to 135° C. The hydrogen pressure was increased to 1,000 p.s.i. and the reduction continued to a hydrogen uptake of 1,000 pounds. Results are shown below.

| Time (hours) | Analysis, Percent by Weight | | | Percent Conversion |
|---|---|---|---|---|
| | Nitrocyclohexane | Cyclohexylamine | Cyclohexanone oxime and N-cyclohexylhydroxylamine | |
| 4¾ | 18.0 | 0.90 | 22.6 | 59.8 |

*Examples XVIII and XIX*

The catalysts of Examples XVIII and XIX were of essentially the same components as the catalysts of Example I except they were composed of 10.5% and 5.0%, respectively, of Ag₂O and were prepared using essentially the same technique and reagents used in Example I. In the preparation for the 10.5% catalyst, 50.0 grams silver acetate, 138.0 grams zinc oxide, 870 grams of 50% aqueous chromium acetate, 14.4 grams calcium acetate, and 100.0 grams of acetic acid in 750 ml. of water were used: in the preparation of the 5% catalyst, 7.2 grams silver acetate, 46.0 grams zinc oxide, 286.5 grams 50% chromium acetate, 4.8 grams calcium acetate, 40.0 grams acetic acid in 200 ml. of water were used. Samples of the catalysts, some activated and some not activated by heat, were tested in the procedure set forth in Example VIII The above results show the advantage of heating the catalyst containing from about 3 to 11% silver oxide. For instance, the catalyst in Run M which was activated by heat required only 1½ hours to provide a significant conversion whereas the catalysts used in Runs K and L, which were not activated by heat, required 3½₁₂ to 3½ hours. Run O, using a catalyst which had been activated with heat, resulted in a take-up of hydrogen immediately whereas Run N, using a catalyst which had not been activated with heat, resulted in an absence of hydrogen take-up after 5 hours.

Now having described my invention, what I claim is:

1. A process for the production of a silver oxide-calcium oxide-zinc oxide-chromium oxide catalyst composed of about 3% to about 20% silver oxide, less than 3% calcium oxide, chromium oxide and zinc oxide in amounts sufficient to provide an active catalyst suitable for the partial reduction of primary and secondary nitroparaffins containing at least two carbon atoms, which comprises slurrying a compound selected from the group consisting of about 4 to about 30 parts by weight silver acetate, from about 3 to about 20 parts by weight silver oxide, from about 4 to about 30 parts by weight silver nitrate, and from about 3 to about 25 parts by weight silver carbonate; with a compound selected from the group consisting of about 95 to about 147 parts by weight zinc acetate and from about 35 to about 55 parts by weight zinc oxide; with a compound selected from the group consisting of about 35 to about 72 parts by weight chromium oxide, from about 105 to about 165 parts by weight chromium acetate and from about 58 to about 92 parts by weight ammonium dichromate with a compound selected from the group consisting of less than about 3 parts by weight calcium oxide, less than 10 parts by weight calcium acetate, and less than 4 parts by weight calcium hydroxide; with acetic acid and water; stirring and evaporating the above said slurry to dryness, and calcinating the residue of the dried slurry at temperatures of from about 250° C. to about 500° C., cooling said residue, triturating said residue with acetic acid, washing said residue with a small amount of water, and drying to obtain the catalyst product.

2. The process of claim 1 wherein the catalyst is composed of about 5% to about 15% silver oxide, less than 3% calcium oxide, and substantially equal parts of chromium oxide and zinc oxide.

3. The process of claim 1 wherein the catalyst is activated by reheating it at temperatures of about 450° C.

4. The process of claim 1 wherein the slurry is composed of 25 parts by weight silver acetate, 135 parts by weight zinc acetate, 140 parts by weight chromium acetate, 5 parts by weight calcium acetate, and water.

5. The process of claim 1 wherein the slurry is composed of 17 parts by weight silver oxide, 50 parts by weight zinc oxide, 62 parts by weight chromium trioxide, 1.7 parts by weight calcium oxide, 50 parts by weight acetic acid, and water.

6. The process of claim 1 wherein the slurry is composed of 45 parts by weight zinc oxide, 57 parts by weight chromium trioxide, 4.8 parts by weight calcium acetate, 15.5 parts by weight silver nitrate, and 48 parts by weight glacial acetic acid, and water.

7. The process of claim 1 wherein the slurry is composed of 12.5 parts by weight silver carbonate, 45 parts by weight zinc oxide, 57 parts by weight chromium trioxide, 2 parts by weight calcium hydroxide, 48 parts by weight glacial acetic acid, and water.

8. The process of claim 1 wherein the catalyst contains from about 3 to 11% silver oxide and the dried catalyst is activated by reheating it at a temperature from about 350 to 500° C.

9. The process of claim 1 wherein the catalyst contains from about 0.01 to 80% weight of alumina.

10. A process for the production of a silver oxide-calcium oxide-zinc oxide-chromium oxide catalyst composed of from about 3 to about 20% silver oxide, less than 3% calcium oxide, and substantially equal parts of chromium oxide and zinc oxide, suitable for the partial reduction of primary and secondary nitroparaffins containing at least 2 carbon atoms, which comprises mixing in the dry state, a compound selected from the group consisting of from about 4 to about 30 parts by weight silver acetate, from about 3 to about 20 parts by weight silver oxide, from about 4 to about 30 parts by weight silver nitrate, from about 3 to about 25 parts by weight silver carbonate; with a compound selected from the group consisting of about 95 to about 147 parts by weight zinc acetate, and from about 35 to about 55 parts by weight zinc oxide; with a compound selected from the group consisting of from about 35 to about 72 parts by weight chromium oxide, from about 105 to about 165 parts by weight chromium acetate and about 58 to about 92 parts by weight ammonium dichromate; with a compound selected from the group consisting of less than about 3 parts by weight calcium oxide, less than about 10 parts by weight calcium acetate, and less than about 4 parts by weight calcium hydroxide; intimately mixing the selected group of compounds, and calcinating the mixture at temperatures of from about 250 to about 500° C., cooling said residue, triturating said residue with acetic acid, washing said residue with a small amount of water, and drying to obtain the catalyst product.

11. The process of claim 10 wherein the mixture is composed of 12.5 parts by weight silver carbonate, 45 parts by weight zinc oxide, 57 parts by weight chromium trioxide, and 4.8 parts by weight calcium acetate; which mixture is calcinated at 450° C.

12. The process of claim 10 wherein the catalyst contains from about 3 to 11% silver oxide and the dried catalyst is activated by reheating it at a temperature from about 350 to 500° C.

13. The process of claim 10 wherein the catalyst contains from about 0.01 to 80% by weight of alumina.

References Cited by the Examiner

UNITED STATES PATENTS

| | | | |
|---|---|---|---|
| 2,047,945 | 7/1936 | Arnold et al. | 252—468 |
| 2,567,140 | 9/1951 | Ashley et al. | 252—468 |
| 2,638,482 | 5/1953 | Grundmann. | |
| 2,697,730 | 12/1954 | Mecorney et al. | 260—593 |
| 2,711,427 | 6/1955 | Christian. | |
| 2,712,032 | 6/1955 | Von Schickh | 260—566 |
| 2,967,200 | 1/1961 | Foster et al. | 260—566 |
| 3,104,261 | 9/1963 | Young | 252—468 X |
| 3,153,091 | 10/1964 | Chandler. | |
| 3,160,663 | 12/1964 | Runge | 252—468 X |

FOREIGN PATENTS 515,581  8/1955  Canada.

OTHER REFERENCES

Grundmann: Agnew. Chem., vol. 62, pp. 558–560 (1950).

OSCAR R. VERTIZ, *Primary Examiner.*

CHARLES B. PARKER, MAURICE A. BRINDISI, F. D. HIGEL, G. OZAKI, *Examiners.*